(12) United States Patent
Lesel

(10) Patent No.: US 11,198,620 B2
(45) Date of Patent: Dec. 14, 2021

(54) INORGANIC NANO-MATERIALS PRODUCED BY THE THERMAL TREATMENT OF METAL-INFUSED ORGANIC POLYMERS

(71) Applicant: NANODIAN, Los Angeles, CA (US)

(72) Inventor: Benjamin Kalman Lesel, Los Angeles, CA (US)

(*) Notice: Subject to any disclaimer, the term of this patent is extended or adjusted under 35 U.S.C. 154(b) by 228 days.

(21) Appl. No.: 16/396,416

(22) Filed: Apr. 26, 2019

(65) Prior Publication Data
US 2019/0330078 A1  Oct. 31, 2019

Related U.S. Application Data

(60) Provisional application No. 62/663,172, filed on Apr. 26, 2018.

(51) Int. Cl.
*C01G 53/00* (2006.01)
*C01G 45/12* (2006.01)

(52) U.S. Cl.
CPC ......... *C01G 53/40* (2013.01); *C01G 45/1242* (2013.01); *C01P 2004/03* (2013.01); *C01P 2004/62* (2013.01); *C01P 2004/64* (2013.01); *C01P 2006/40* (2013.01)

(58) Field of Classification Search
CPC . C01G 53/40; C01G 45/1242; C01P 2004/03; C01P 2004/62; C01P 2004/64; C01P 2006/40
See application file for complete search history.

(56) References Cited

U.S. PATENT DOCUMENTS 8,226,878 B2 * 7/2012 Huo .................. B23K 26/55
264/400

OTHER PUBLICATIONS

Galow, Trent H., et al. "Highly reactive heterogeneous Heck and hydrogenation catalysts constructed through 'bottom-up' nanoparticle self-assembly." Chemical Communications 10 (2002): 1076-1077.*
Pomogailo, Anatolii D., et al. "Kinetics and mechanism of in situ simultaneous formation of metal nanoparticles in stabilizing polymer matrix." Journal of Nanoparticle Research 5.5-6 (2003): 497-519.*
Mallick, Kaushik, Mike J. Witcomb, and Mike S. Scurrell. "In situ synthesis of copper nanoparticles and poly (o-toluidine): A metal-polymer composite material." European polymer journal 42.3 (2006): 670-675.*
Mathew, Aiswarea, et al. "Preparation and characterization of siloxane modified: Epoxy terminated polyurethane-silver nanocomposites." Polymer Composites 39.S4 (2018): E2390-E2396.*

(Continued)

*Primary Examiner* — Richard M Rump
(74) *Attorney, Agent, or Firm* — Merle W Richman, III

(57) ABSTRACT

A method of forming an inorganic nano-material by thermally treating metal-infused organic polymers to remove the organics to leave an inorganic nano-material where the metal-infused organic polymer precursor may be formed by a polymer synthesis reaction of organic monomers with a metal-containing precursor and by combining a metal containing precursor with at least one organic monomer to obtain a mixture and initiating a polymerization reaction of the mixture to form a metal-infused organic polymer precursor.

18 Claims, 3 Drawing Sheets

20B

(56) References Cited

OTHER PUBLICATIONS

Yanagihara, Naohisa, et al. "Preparation and Characterization of Ag-Cluster in Poly (Methylmethacrylate)." MRS Online Proceedings Library Archive 457 (1996).*
Hong, Hyun-Ki, Chan-Kyo Park, and Myoung-Seon Gong. "Preparation of Ag/PVP nanocomposites as a solid precursor for silver nanocolloids solution." Bulletin of the Korean Chemical Society 31.5 (2010): 1252-1256.*
Pomogailo, Anatolii D., et al. "Hafnium-containing nanocomposites." Journal of Thermoplastic Composite Materials 20.2 (2007): 151-174.*
Jiang, C. H., et al. "Synthesis of spinel LiMn2O4 nanoparticles through one-step hydrothermal reaction." Journal of Power Sources 172.1 (2007): 410-415.*
Using Nanoscale Domain Size to Control Charge Storage Kinetics in Pseudocapacitive Nanoporous LiMn2O4 Powders, Benjamin K. Lesel,John B. Cook,Yan Yan, Terri C. Lin, and Sarah H. Tolbert, ACS Energy Lett. 2017, 2, 2293-2298.
Mesoporous LixMn2O4 Thin Film Cathodes for Lithium-Ion Pseudocapacitors, Benjamin K. Lesel, Jesse S. Ko, Bruce Dunn, and Sarah H. Tolbert, ACS Nano 2016, 10, 7572-7581.
General Method for the Synthesis of Hierarchical Nanocrystal-Based Mesoporous Materials, Iris E. Rauda,† Raffaella Buonsanti, Laura C. Saldarriaga-Lopez,Kanokraj Benjauthrit, Laura T. Schelhas, Morgan Stefik,Veronica Augustyn, Jesse Ko, Bruce Dunn, Ulrich Wiesner, Delia J. Milliron, and Sarah H. Tolbert, ACS Nano 2012 vol. 6, No. 7, 6386-6399.
Influence of Environmental Factors on the Adsorption Capacity and Thermal Conductivityof Silica Nano-Porous Materials, Zhang et al., Journal of Nanoscience and Nanotechnology vol. 14, 1-7, 2014.

* cited by examiner

INORGANIC NANO-MATERIALS PRODUCED BY THE THERMAL TREATMENT OF METAL-INFUSED ORGANIC POLYMERS

TECHNICAL FIELD

This disclosure generally relates to syntheses of inorganic nano-materials produced by the thermal treatment of metal-infused organic polymers.

BACKGROUND

Inorganic nano-materials are of broad interest to a number of industries for many applications such as energy storage, energy production, scratch resistant coatings, air scrubbing, drug delivery and hydrophobic materials to name a few. Typical syntheses of these materials require expensive techniques and/or environmentally harmful reagents with a multitude of time-consuming steps, often making these processes impractical for commercial production and scaling.

In the interest of producing cost effective, less harmful environmentally and scalable inorganic nano-materials with cheap reagents and few processing steps, the necessity arose to develop embodiments of this disclosure.

BRIEF EXPLANATIONS OF THE DRAWINGS

DETAILED DESCRIPTION

Figure 3:
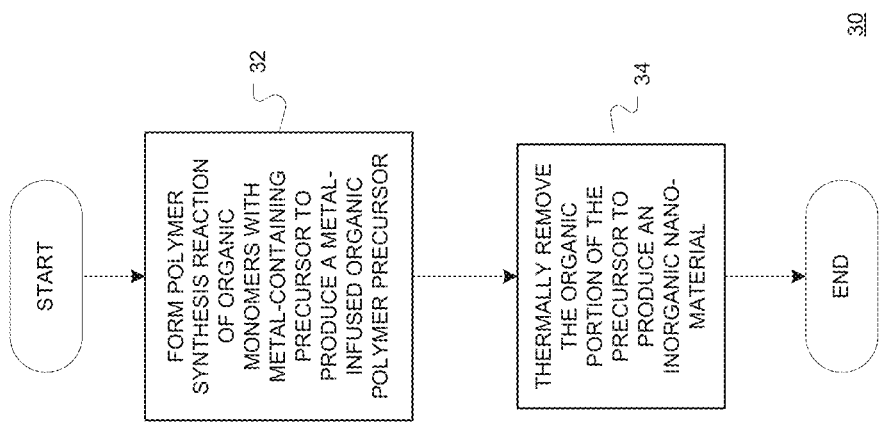
FIG. 3 is a flow diagram illustrating several methods of producing inorganic nano-materials according to various embodiments.

In this disclosure, the inorganic nano-material synthesis is streamlined and avoids numerous processing stages that would be unfavorable to scale-up and avoids use of environmentally harmful and expensive reagents. Unlike other nano-material syntheses which require 3 or more steps to fabricate the final product, the method described herein may include only two primary steps (See FIG. 1 and algorithm 30 shown in FIG. 3):

1) A polymer synthesis reaction of organic monomers with metal-containing precursor to produce a metal-infused organic polymer precursor (activity 32 of algorithm 30 shown in FIG. 3); and 2) Thermal removal of the organic portion of the precursor to produce an inorganic nano-material (activity 34 of algorithm 30 shown in FIG. 3)

Figure 1:
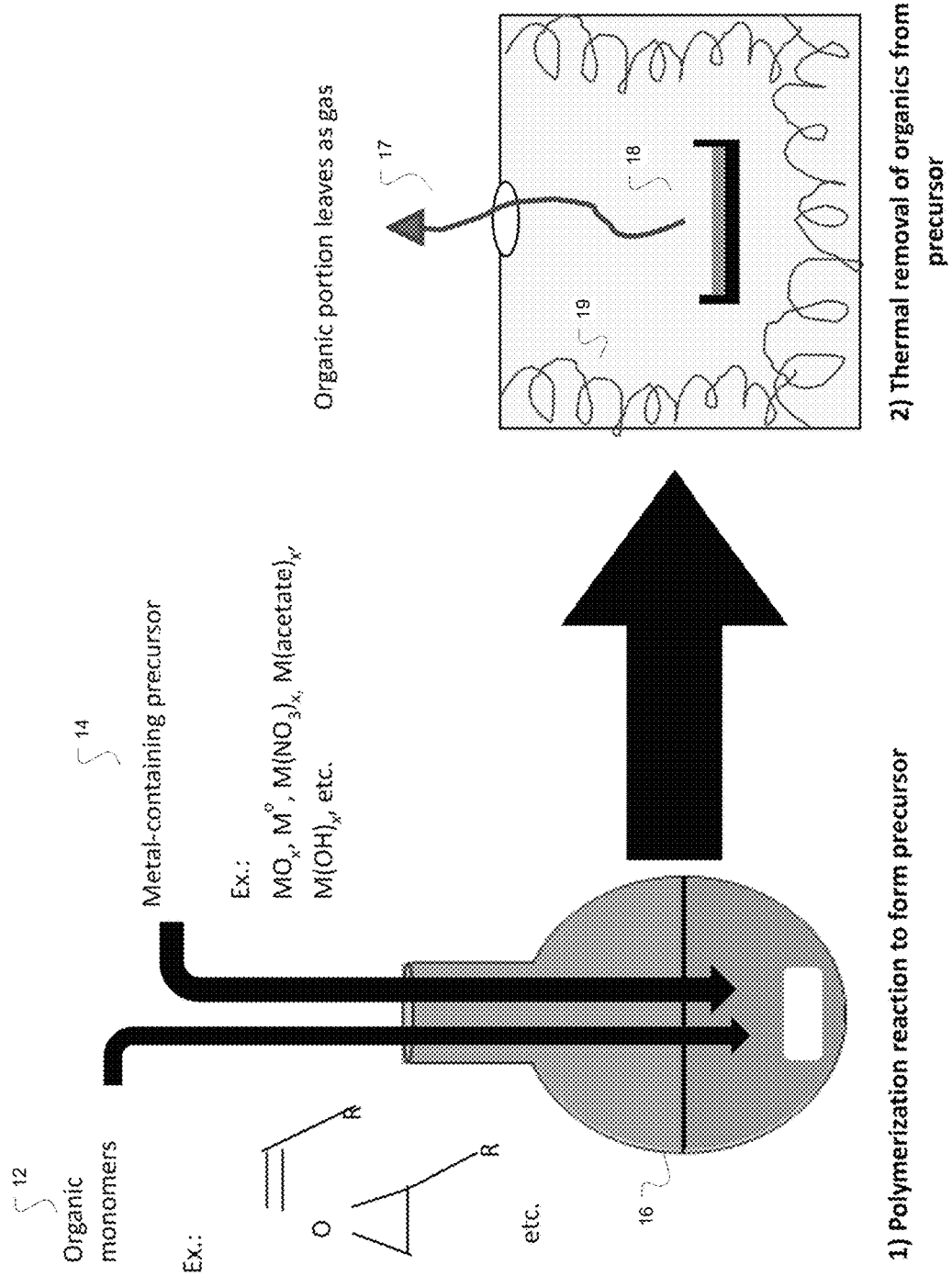
FIG. 1 is a simplified diagram of a synthetic method of producing inorganic nano-materials by thermally treating metal-infused organic polymers according to an embodiment of the present invention.

As shown in FIG. 1 and FIG. 3, an activity 32 of an embodiment 10 involves the synthesis of one or more organic monomers 12 capable of reacting to form a polymer (covalently bonded structural units) in the same reaction flask 16 as one or more metal-containing precursors 14. In an embodiment where this synthesis produces fine nano-structures, the metal-containing precursor 14 may be somewhat soluble in one of the phases in the polymer formation reaction. In some embodiments of this algorithm 30, the metal-containing precursors 14 may contain an alkali metal, alkaline earth metal, transition metal, post-transition metal, metalloid, lanthanide, and/or actinide in the form of either pure metal, oxide, chalcogenide, nitride, and/or a metal salt such as nitrate, hydroxide, carbonate, acetate, halide or other.

In an embodiment an inorganic nano-material 18 is formed by combining one or more metal containing precursors 14 with one or more organic monomers 12 to obtain a mixture. Then a polymerization reaction of the mixture may be initiated to form an interconnected polymer/metal-ion matrix. The resultant matrix may be calcinated to remove organics 17 and form an inorganic nano-material 18. In an embodiment, the organic monomer may contain one or more π-bonds including but not limited to: carbon-carbon, carbon-oxygen, carbon-nitrogen, nitrogen-nitrogen. In an embodiment, the polymerization reaction initiation may include radical, anionic, and cationic polymerization. In an embodiment, the metal ion in the metal containing salt may be an alkali metal, alkaline earth metal, transition metal, post-transition metal, metalloid, lanthanide, or actinide.

In an embodiment, the resulting polymer is coordinated to the metal-ions. In an embodiment, the polymer/metal-ion matrix may be heated to a range between about 300° C. to about 800° C. at a rate of about 1° C. per hour to about 500° C. per hour and kept at said temperature for up to 48 hours. In an embodiment, the heating of the polymer/metal-ion matrix includes crystallization of the resulting inorganic nano-material. In an embodiment, the inorganic nano-material may be used in an electrode for a lithium ion battery. In an embodiment, the inorganic nano-material may be used in a cathode for a lithium ion battery, catalyst or other device. In an embodiment, the inorganic nano-material may be used in a device or fabrication.

In some embodiments, the organic monomers 12 contain one or more π-bonds (including but not limited to carbon-carbon, carbon-oxygen, carbon-nitrogen, nitrogen-nitrogen) and/or epoxides capable of polymerizing via radical, anionic, cationic or other polymerizations mechanisms.

In some embodiments, the polymerization reaction may be initiated by a catalyst, whereas in other embodiments it may be initiated by heat, agitation or other polymerization stimulating effects.

In some embodiments, "metal-infused organic polymer" refers to an organic polymer which has metal atoms coordinated to its functional groups. In other embodiments, "metal-infused organic polymer" refers to an organic polymer which has metal atoms trapped within the polymer matrix.

In an embodiment as shown in FIG. 1 and FIG. 3, an activity 34 of an embodiment 10, may include the removal of the organic portion of the precursor may be performed by heating up the metal-infused organic polymer precursor to a temperature of 350 to 750° C. and about 550 to 750° C. In an embodiment, the metal-infused organic polymer precursor may be soaked for up to 24 hours and about 10 hours. In an embodiment, heating 19 the metal-infused organic polymer precursor to temperatures of 350 to 750° C. and about 550-750° C. results in the simultaneous organic removal and inorganic fusion which leads to an inorganic nano-material end-result 18.

In some embodiments, an activity may include the evaporation of excess solvent between the two activities 32, 34 listed above by heating and/or pulling vacuum on the metal-infused organic polymer precursor in order to prevent excess swelling and/or unwanted side reactions. In a typical procedure, evaporation at a temperature just below the boiling point of a solution may be used while stirring in air and then once condensed may be transferred to a heat resistant substrate (stainless steel, fused quartz, etc.) and heated under vacuum at just below the boiling point of the solvent. In an embodiment, a common solvent that may be used is water which may be removed by heating the metal-infused organic polymer precursor in an oil bath at 95° C. for about 2-4 hours followed by transfer to a steel or fused quartz substrate and heated at 95° C. under vacuum for an additional 2+ hours.

Inorganic nanomaterials produced from these various methods may include morphologically interconnected nodes or globules with free space between the nodes or globules. In some embodiments the resulting nano-materials may have crystallite sizes between 5 to 100 nm and about 5-40 nm determined by the Scherrer width acquired from X-ray diffraction (XRD) data. In some embodiments, the resulting particle size has been observed to be between 10 nm to 300 nm and about 10 nm to about 100 nm by scanning electron microscopy (SEM).

Some embodiments relate to a method for producing an inexpensive, and scalable nano-materials for use as the active materials in lithium ion batteries. In another embodiment, the resulting nano-material may be used as a high surface area heterogeneous catalyst. In other embodiments, the resultant nano-material may be used an air-scrubbing and/or liquid-purifying nano-material, such as for capture of large particles, carbon dioxide or other air or liquid-born molecules. It should be noted that in an embodiment the use of nano-materials produced from these various methods is not limited to those stated above but includes a multitude of products and uses not listed.

When a nano-material produced from this synthesis is used as an active material in a lithium ion battery, it can be directly substituted for either the anode or cathode (depending on the composition) material in a slurry which is then typically cast on conductive foil for use as an electrode in a lithium ion battery. When paired with another electrode material in a lithium ion cell, the resulting battery can be capable of extremely fast charging in the range of several minutes with high cycling life times when paired with another electrode material of equivalent kinetic and cycling advancement.

The embodiments described herein are provided to illustrate and provide a detailed description for those of ordinary skill in the art. The embodiments should not be construed as limiting, as the embodiments merely provide one of many methodologies.

In an embodiment, an inorganic nano-material used for various applications may be produced via synthesis according to various methods. To produce such an inorganic nano-material according to an embodiment, an amount of one or more metal-containing precursors 14 containing an alkali metal, alkaline earth metal, transition metal, post-transition metal, metalloid, lanthanide, and/or actinide in the form of either pure metals, oxides, chalcogenides, nitrides, and/or metal salts such as nitrates, hydroxides, carbonates, acetates, halides or others in some embodiments is combined with one or more organic monomers 12 containing one or more π-bonds (including but not limited to carbon-carbon, carbon-oxygen, carbon-nitrogen, nitrogen-nitrogen) and/or epoxides capable of polymerizing via radical, anionic, cationic or other polymerizations mechanisms in some embodiments in glassware 16 such as a round bottom flask or other heating vessel of glass or a different material that may include a condenser in some embodiments.

In some embodiments, an amount of an organic surfactant is added to the solution and in some embodiments a solvent such as water, ethanol or other solvent is also added to the solution. In an embodiment, the pH of the solution is controlled by addition of any number of buffers such as ammonia, tartaric acid, acetate or other. In some embodiments, the resulting solution is then either heated, stirred or agitated at low heat typically below the boiling point of the solvent in some embodiments.

In some embodiments, a catalyst and/or initiator is added to the solution to initiate polymerization of the metal-infused organic polymer at a set time and/or times. In some embodiments the solution is vigorously stirred with a stirbar during initiator addition and in some embodiments is continuously stirred vigorously throughout the reaction. In some embodiments, the temperature 19 of the solution is adjusted during the reacting and in some embodiments is soaked at a specific temperature for a set amount of time to form a metal-infused organic polymer 18. In some embodiments, the resulting metal-infused organic polymer solution is then dried either by heating without a condenser and/or heated under vacuum on a Schlenk line, in a vacuum oven, and/or other means of solvent removal resulting in a metal-infused organic polymer gel, tar, foam or other dehydrated precursor to an inorganic nano-material. In some embodiments, the metal-infused organic polymer is transferred from its original heating vessel to a substrate usually made of a heat resistant material (Pyrex glass, stainless steel, fused silica, etc.) either before or after solvent removal and in some embodiments, directly after synthesis of the metal-infused organic polymer.

In an embodiment, the metal-infused polymer precursor 14 and substrate are then put into a heating device such as a kiln, muffles furnace, oven, etc. and heated either in air or other gas with a relatively slow ramp of about 40-120° C./hour from about 100° C. to about 300-800° C. and soaked for up to 10 hours or less to produce an inorganic nano-material 18. A resulting inorganic nano-material powder may be obtained by dislodging the solid material from the substrate surface in an embodiment.

In an embodiment, the resulting inorganic nano-material 18 may be amorphous or crystalline with a crystallite size between about 5-60 nm. The resulting inorganic nano-material structure may include micron-sized particles with interconnected or individual nano-sized globules, plates, spheres, rods, needles, or other nano-structures with at least one dimension of the particles in the range of about 10-100 nm but sometimes with larger particles formed from areas with lower organic to inorganic ratio.

In an embodiment, the resultant inorganic nano-material 18 may be used for a variety of applications including but not limited to an active material in a lithium ion battery, a heterogeneous catalyst for water splitting, super hard scratch resistant coating additive, air filtration nano-material, drug delivery nano-material and coating additive to increase hydrophobicity.

Figure 2B:
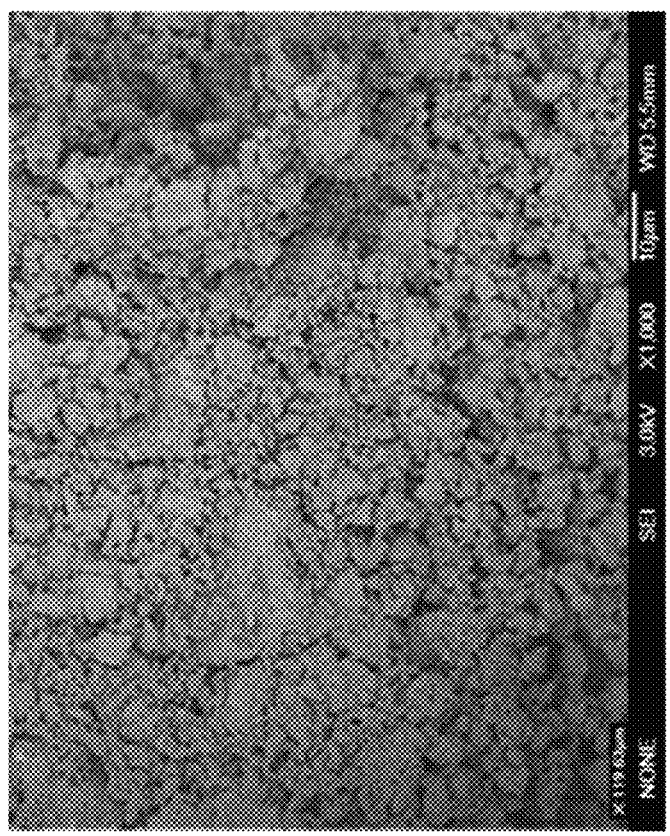
FIG. 2B is a zoomed out scanning electron microscope (SEM) image of nano-$LiMn_2O_4$ produced by the thermal treatment of a Mn and Li infused organic polymer according to an embodiment of the present invention.

In an embodiment, the resultant inorganic nano-material 18 may include or be nano-$LiMn_2O_4$ (SEM images 20A, 20B of same or similar shown in FIGS. 2A and 2B) where such a nano-material may be employed as a cathode material for lithium ion batteries in an embodiment. To produce such a nano-material according to an embodiment, about 2.2 mmol of lithium nitrate and about 4.0 mmol of manganese (II) nitrate may be mixed with about 12.4 mmol of methyl methacrylate, about 0.3 mmol of sodium lauryl sulfate, and about equal volume of water to methyl methacrylate and then heated and stirred in a round bottom flask with condenser at about 60° C. in an oil bath. After about 5 minutes, about 70 µmol of ammonium persulfate is added to initiate the formation of the metal-infused organic polymer. The temperature of the solution is then allowed to reach about 70° C. for about 1-3 hours to form a metal-infused organic polymer. In an embodiment, the solution is then dried by first heating without a condenser at 95° C. to remove excess water for about 2-4 hours until the solution becomes a somewhat viscous gel and about ⅖th of the initial volume. In an embodiment, the resulting metal-infused polymer gel may be poured onto a substrate (such stainless steel or fused quartz or others depending on what temperature is needed for the last step) and then heated under vacuum in a vacuum oven at 95° C. for about 2-4 hours to form a solid foam. In an embodiment, the metal-infused polymer foam is then put into a kiln in air atmosphere with a ramp of about 40-200° C./hour from about 100° C. to about 550-750° C. and soaked for up to 10 hours or less to produce the inorganic nano-material. A resulting inorganic nano-material including nanostructured LiMn2O4 powder may be obtained by dislodging the solid material from the substrate surface.

Figure 2A:
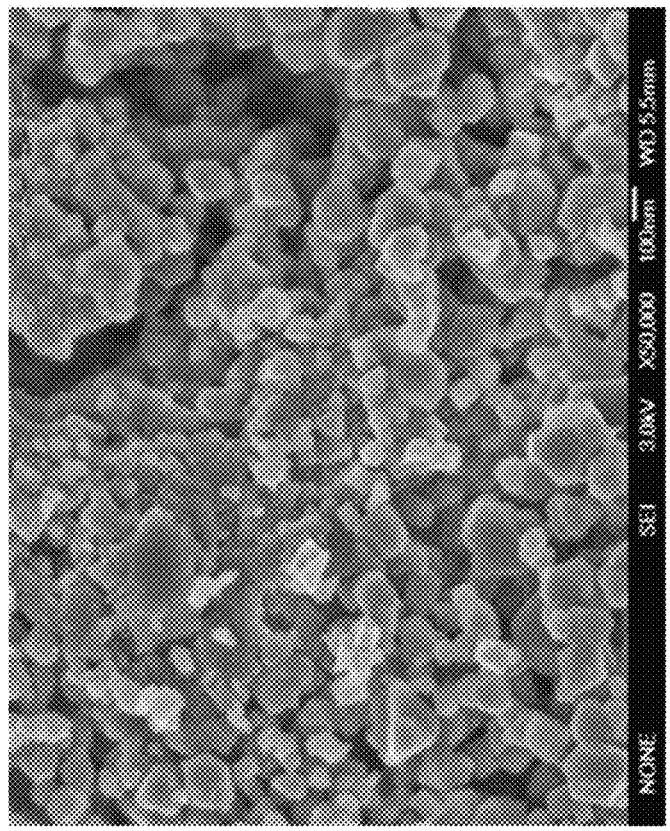
FIG. 2A is a close-up scanning electron microscope (SEM) image of nano-$LiMn_2O_4$ produced by the thermal treatment of a Mn and Li infused organic polymer according to an embodiment of the present invention.

In an embodiment, the resulting inorganic nano-material may be pure or substantially pure $LiMn_2O_4$ with a crystallite size between about 5-50 nm. The resulting inorganic nano-material structure may include micron-sized particles with interconnected nano-sized globules at the surface of about 10-200 nm or about 10-100 nm. FIG. 2A includes a close-up scanning electron microscope (SEM) image 20A of $LiMn_2O_4$ nano-sized globules produced according to an embodiment, and FIG. 2B includes a zoomed-out SEM image 20B of the micron structure of the $LiMn_2O_4$ inorganic nano-material structure.

In an embodiment, the resultant $LiMn_2O_4$ inorganic nano-material may be crushed into a powder which may be used as the active cathode material in a lithium ion battery. In an embodiment, slurries made with resultant $LiMn_2O_4$ inorganic nano-material may achieve mass loadings in the range of about 0.1-200 mg/cm² and about 1-40 mg/cm². A resulting electrode formed with a nano-material according to an embodiment may be charged and discharged as fast as about 6 minutes versus lithium metal or when paired with any anode material of similar kinetic ability in any standard electrolyte with any standard separator (in addition to those electrolytes and separators which are not standard but allow fast ionic mobility). Further, this structure formed according to an embodiment may be charged and discharged reversibly for many thousands of cycles due to the nature of nano-materials according to an electrode that are used in the electrodes. It should be noted that for nano-$LiMn_2O_4$, resulting crystal and particle size has a trade-off of energy density and kinetic ability; thus a range of sizes are useful for different applications.

In another embodiment, a resultant inorganic nano-material may include or be a nano-NiFeO3 where such a nano-material may be employed as a heterogeneous water-splitting catalyst. To produce such a nano-material according to an embodiment, about 4.0 mmol of nickel nitrate and about 4.0 mmol of iron nitrate may be mixed with about 12.4 mmol of methyl methacrylate, about 0.3 mmol of sodium lauryl sulfate, and about equal volume of water to methyl methacrylate and then heated and stirred in a round bottom flask with a condenser at about 60° C. in an oil bath. After about 5 minutes, about 70 µmol of ammonium persulfate may be added. The temperature of this solution may be then allowed to reach about 70° C. for about 1-3 hours to form a metal-infused organic polymer. In an embodiment, the solution is then dried by first heating without a condenser at 95° C. to remove excess water for about 2-4 hours until the solution becomes a somewhat viscous gel and about ⅖th of the initial volume.

In an embodiment, the resulting metal-infused polymer gel may be poured onto a substrate (such stainless steel or fused quartz or others depending on what temperature is needed for the last step) and then heated under vacuum in a vacuum oven at 95° C. for about 2-4 hours to form a solid foam. In an embodiment, the metal-infused polymer foam is then poured onto a substrate (such as a borosilicate petri dish or steel plate) and then heated in a kiln in air atmosphere with a ramp of about 40-200° C./hour from about 100° C. to about 550-750° C. and soaked for up to 10 hours or less to produce the inorganic nano-material. A resulting inorganic nano-material including a nanostructured $FeNiO_3$ powder may be obtained by dislodging the solid material from the substrate surface.

In an embodiment, the resultant inorganic nano-material may be pure or substantially pure $FeNiO_3$ with a crystallite size between about 5-50 nm and about 5-30 nm. The resultant inorganic $FeNiO_3$ nano-material may include micron-sized particles with interconnected nano-sized globules at the surface of about 10-100 nm. In an embodiment, the resultant inorganic $FeNiO_3$ nano-material may be crushed into a powder that may be used as an electrode in a water splitting electrolysis device. Resulting slurries made including resultant inorganic $FeNiO_3$ nano-material crushed into a powder may achieve mass loadings in the range of about 0.1-200 mg/cm². In an embodiment, an electrode including the resultant inorganic $FeNiO_3$ nano-material crushed into a powder may split water at a lower overpotential of around 0.3 mV with high throughput above 10 mA/cm².

As used herein, the singular terms "a," "an," and "the" may include plural referents unless the context clearly dictates otherwise. Thus, for example, reference to an material or embodiments may include multiple materials or embodiments unless the context clearly dictates otherwise.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made, and equivalents may be substituted without departing from the true spirit and scope of the disclosure as defined by the appended claim(s). In addition, many modifications may be made to adapt a particular situation, material, composition of matter, method, operation or operations, to the objective, spirit and scope of the disclosure. All such modifications are intended to be within the scope of the claim(s) appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

What is claimed is:

1. A method of producing an interconnected inorganic nano-material including:
   forming a metal-infused organic polymer precursor by a polymer synthesis reaction of at least one organic monomer and at least one metal-containing precursor; and
   heating the formed metal-infused organic polymer precursor to completely remove organics to produce an interconnected inorganic nano-material.

2. The method of producing an interconnected inorganic nano-material of claim 1, wherein at least one organic monomer includes at least one π-bond.

3. The method of producing an interconnected inorganic nano-material of claim 1, wherein at least one organic monomer includes at least one epoxide.

4. The method of producing an interconnected inorganic nano-material of claim 1, wherein the synthesis is initiated by at least one initiator molecule.

5. The method of producing an interconnected inorganic nano-material of claim 1, wherein at least one metal-containing precursor includes at least one of alkali metal, alkaline earth metal, transition metal, post-transition metal, metalloid, lanthanide and actinide.

6. The method of producing an interconnected inorganic nano-material of claim 1, wherein the metal containing precursor includes at least one of nitrate, hydroxide, carbonate, acetate, and halide.

7. The method of producing an interconnected inorganic nano-material of claim 1, wherein the resulting polymers functional groups in the metal-containing precursor are coordinated to the metal from the metal-containing precursor forming an interconnected polymer/metal-ion matrix.

8. The method of producing an interconnected inorganic nano-material of claim 1, wherein heating the metal-infused organic polymer precursor includes crystallization of the resulting inorganic nano-material.

9. A method of producing an interconnected inorganic nano-material, comprising:
   combining at least one metal containing precursor with at least one organic monomer to obtain a mixture;
   initiating a polymerization reaction of the mixture to form a metal-infused organic polymer precursor; and
   producing an interconnected inorganic nano-material without organics from the formed metal-infused organic polymer precursor.

10. The method of producing an interconnected inorganic nano-material of claim 9, wherein the metal-infused organic polymer precursor is heated to remove organics.

11. The method of producing an interconnected inorganic nano-material of claim 10, wherein at least one organic monomer includes at least one π-bond.

12. The method of producing an interconnected inorganic nano-material of claim 11, wherein at least one organic monomer includes at least one epoxide.

13. The method of producing an interconnected inorganic nano-material of claim 11, wherein the synthesis is initiated by at least one initiator molecule.

14. The method of producing an interconnected inorganic nano-material of claim 11, wherein at least one metal-containing precursor contains at least one of alkali metal, alkaline earth metal, transition metal, post-transition metal, metalloid, lanthanide and/or actinide.

15. The method of producing an interconnected inorganic nano-material of claim 11, wherein the metal containing precursor includes at least one of nitrate, hydroxide, carbonate, acetate, and/or halide.

16. The method of producing an interconnected inorganic nano-material of claim 11, wherein the resulting polymers functional groups in the metal-containing precursor are coordinated to the metal from the metal-containing precursor forming an interconnected polymer/metal-ion matrix.

17. The method of producing an interconnected inorganic nano-material of claim 10, wherein heating the metal-infused organic polymer precursor includes crystallization of the resulting inorganic nano-material.

18. The method of producing an interconnected inorganic nano-material of claim 10, wherein heating the metal-infused organic polymer precursor includes crystallization of the resulting interconnected inorganic nano-material while completely removing organics.

* * * * *